(12) United States Patent
Gross

(10) Patent No.: US 7,668,097 B2
(45) Date of Patent: Feb. 23, 2010

(54) METHOD OF DORMANT DATA SESSION REACTIVATION

(75) Inventor: Joel L. Gross, Gilbert, AZ (US)

(73) Assignee: Motorola, Inc., Schaumburg, IL (US)

( * ) Notice: Subject to any disclaimer, the term of this patent is extended or adjusted under 35 U.S.C. 154(b) by 1067 days.

(21) Appl. No.: 11/104,003

(22) Filed: Apr. 12, 2005

(65) Prior Publication Data

US 2006/0227783 A1    Oct. 12, 2006

(51) Int. Cl.
*H04L 1/00* (2006.01)
(52) U.S. Cl. .................. 370/234; 370/329; 370/389; 370/509; 726/23
(58) Field of Classification Search .............. 370/466, 370/389, 469, 395.5, 395.52, 401, 509, 230, 370/234, 329; 726/22, 23, 24, 25; 340/466, 340/389, 469, 395.5, 395.52, 401, 509, 230, 340/234, 329
See application file for complete search history.

(56) References Cited

U.S. PATENT DOCUMENTS

| | | | |
|---|---|---|---|
| 6,507,908 B1 * | 1/2003 | Caronni ................ | 713/153 |
| 6,628,671 B1 * | 9/2003 | Dynarski et al. ........ | 370/469 |
| 6,654,360 B1 * | 11/2003 | Abrol ................. | 370/329 |
| 6,687,252 B1 * | 2/2004 | Bertrand et al. ....... | 370/401 |
| 7,079,499 B1 * | 7/2006 | Akhtar et al. .......... | 370/310 |
| 7,106,691 B1 * | 9/2006 | DeCaluwe et al. ...... | 370/229 |
| 7,149,223 B2 * | 12/2006 | Liva et al. ............. | 370/401 |
| 7,359,353 B2 * | 4/2008 | Sayeedi ............... | 370/331 |
| 2005/0039104 A1 * | 2/2005 | Shah et al. ............ | 714/776 |
| 2005/0278784 A1 * | 12/2005 | Gupta et al. ........... | 726/23 |
| 2006/0050668 A1 * | 3/2006 | Harper et al. .......... | 370/338 |

OTHER PUBLICATIONS

Identification of repeated denial of service attacks by Alefiya et al. (Aug. 2003).*
Survey of denial of service countermeasures by Pin-Herng Denny Lin (Nov. 2000).*
Denial -of-service & Distributed denial-of-service on th eInternet by Ormiston et al. (Apr. 2003).*

* cited by examiner

*Primary Examiner*—Jason E Mattis
*Assistant Examiner*—Dady Chery

(57) ABSTRACT

A method for dormant data session reactivation may include a packet control function (118) in a radio access network (104) receiving a first data packet (150) having a source IP address (152), where the first data packet has a destination IP address (152) addressed to reactivate a dormant mobile station (102) coupled to the radio access network. The packet control function may receive a plurality of subsequent data packets (160) having the source IP address, where each of the plurality of subsequent data packets has a subsequent destination IP address (162, 164, 166) and a corresponding time stamp (163, 165, 167). For each of the subsequent destination IP addresses that are substantially sequential, evaluating an absolute value of a slope (270) of the difference between the subsequent destination IP addresses that are substantially sequential over a difference in the corresponding time stamps. If the absolute value of the slope is less than a threshold function (280), denying the first data packet and preventing reactivation of the dormant mobile station by the first data packet.

20 Claims, 4 Drawing Sheets

METHOD OF DORMANT DATA SESSION REACTIVATION

BACKGROUND OF INVENTION

In cellular network systems, particularly CDMA cellular networks, a mobile station may be in a dormant state, where the cellular network is aware of the mobile station on the system, but currently, there is no activity with the mobile station. In other words, the mobile station is registered with the cellular network, but in a dormant data session as no active communication sessions are taking place. An example of this is a mobile station that is registered and has been active in the cellular network, but is currently inactive without having powered off, such as a mobile station in a push-to-talk session, a mobile station awaiting a paging request, and the like.

In prior art CDMA cellular networks, Internet users may cause abnormally high paging rates by implementing malicious Internet Protocol (IP) scans that can overload the cellular network system. These malicious IP scans are often implemented to search for mobile stations in a dormant data session in order to reactivate them. The prior art is deficient in distinguishing these malicious users of the cellular network system from legitimate users.

There is a need, not met in the prior art, for a method of dormant data session reactivation. Accordingly, there is a significant need for an apparatus and method that overcomes the deficiencies of the prior art outlined above.

BRIEF DESCRIPTION OF THE DRAWINGS

Representative elements, operational features, applications and/or advantages of the present invention reside inter alia in the details of construction and operation as more fully hereafter depicted, described and claimed—reference being made to the accompanying drawings forming a part hereof, wherein like numerals refer to like parts throughout. Other elements, operational features, applications and/or advantages will become apparent in light of certain exemplary embodiments recited in the Detailed Description, wherein:

Figure 1:
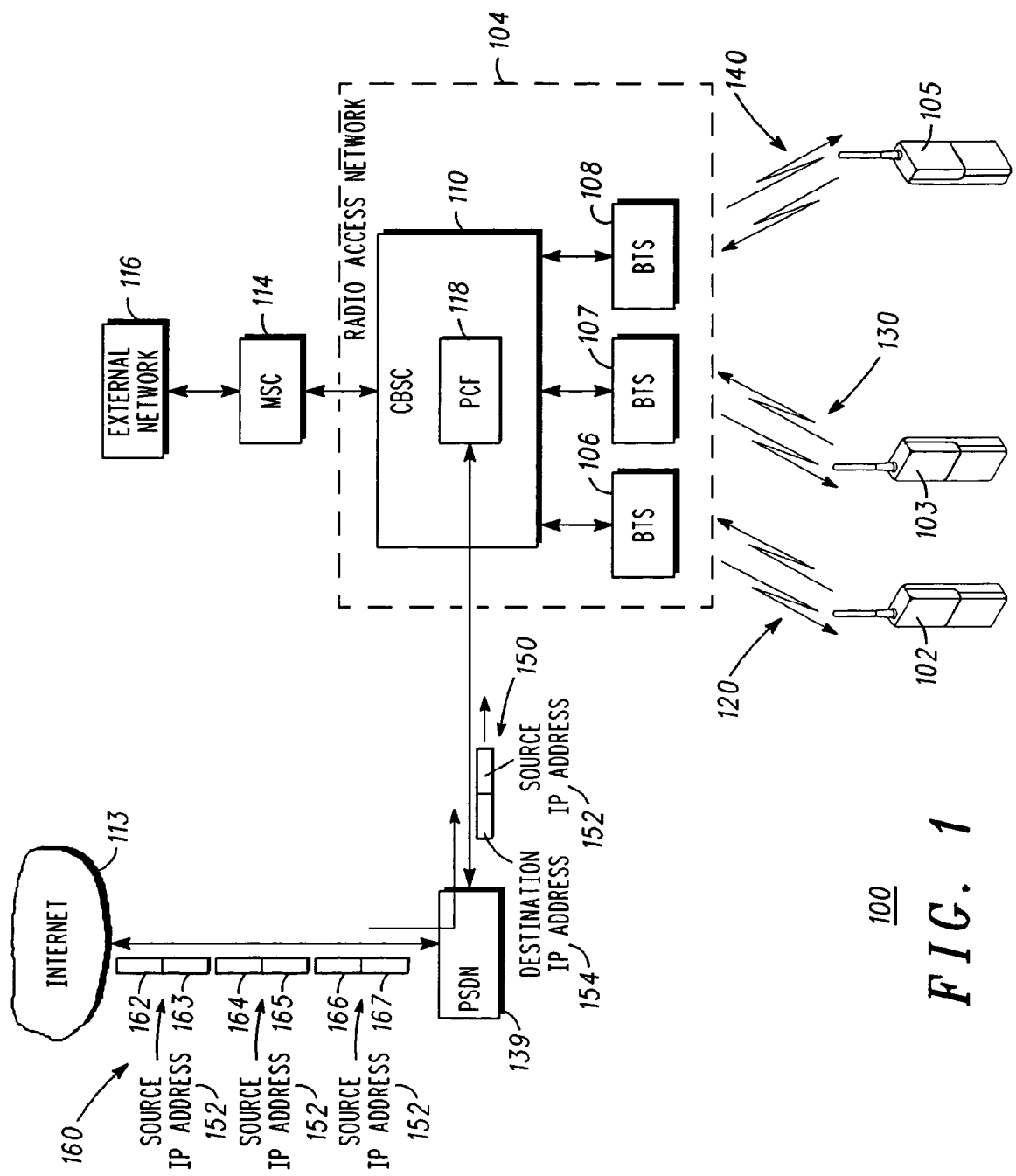
FIG. 1 representatively illustrates a wireless communication system in accordance with an exemplary embodiment of the present invention.

Elements in the Figures are illustrated for simplicity and clarity and have not necessarily been drawn to scale. For example, the dimensions of some of the elements in the Figures may be exaggerated relative to other elements to help improve understanding of various embodiments of the present invention. Furthermore, the terms "first", "second", and the like herein, if any, are used inter alia for distinguishing between similar elements and not necessarily for describing a sequential or chronological order. Moreover, the terms "front", "back", "top", "bottom", "over", "under", and the like in the Description and/or in the Claims, if any, are generally employed for descriptive purposes and not necessarily for comprehensively describing exclusive relative position. Any of the preceding terms so used may be interchanged under appropriate circumstances such that various embodiments of the invention described herein may be capable of operation in other configurations and/or orientations than those explicitly illustrated or otherwise described.

DETAILED DESCRIPTION OF EXEMPLARY EMBODIMENTS

The following representative descriptions of the present invention generally relate to exemplary embodiments and the inventor's conception of the best mode, and are not intended to limit the applicability or configuration of the invention in any way. Rather, the following description is intended to provide convenient illustrations for implementing various embodiments of the invention. As will become apparent, changes may be made in the function and/or arrangement of any of the elements described in the disclosed exemplary embodiments without departing from the spirit and scope of the invention.

A detailed description of an exemplary application, namely a method of dormant data session reactivation, is provided as a specific enabling disclosure that may be generalized to any application of the disclosed system, device and method in accordance with various embodiments of the present invention.

Wireless communication systems are well known and consist of many types including land mobile radio, cellular radiotelephone (inclusive of analog cellular, digital cellular, personal communication systems (PCS) and wideband digital cellular systems), and other communication system types. In cellular radiotelephone communication systems, for example, a number of communication cells are typically comprised of one or more Base Transceiver Stations (BTS's) coupled to one or more Base Station Controllers (BSCs) or Central Base Station Controllers (CBSCs) and forming a Radio Access Network (RAN). The BSCs or CBSCs are, in turn, coupled to a Mobile Switching Center (MSC) that provides a connection between the RAN and an external network, such as a Public Switched Telephone Network (PSTN), as well as interconnection to other RANs. Each BTS provides communication services to a mobile station (MS) located in a coverage area serviced by the BTS via a communication resource that includes a forward link for transmitting signals to, and a reverse link for receiving signals from, the MS.

FIG. 1 representatively illustrates a wireless communication system 100 in accordance with an exemplary embodiment of the present invention. Wireless communication system 100 includes a RAN 104 comprising multiple BTSs 106-108 that are each coupled to a CBSC 110. RAN 104 is coupled to an MSC 114, and MSC 114 is in turn coupled to an external network 116 and provides a communication link between the external network, or other RANs, and RAN 104. In an embodiment, RAN 104 is a CDMA network.

Wireless communication system 100 further includes a mobile station 102, 103, 105 that is in a dormant data session with a BTS 106, 107, 108. That is, mobile station 102, for example, is not in an active communication session with BTS 106, but is powered-up, registered and may have been recently in an active communication session with BTS 106. While RAN 104 is aware of mobile station 102, no active communication is currently occurring between mobile station 102 and RAN 104. In a dormant data session, mobile station 102 is a dormant mobile station, which is registered with RAN 104 and coupled to send or receive data via wireless link 120. Each communication link 120, 130, 140 includes a respective forward link for conveyance of signals to mobile station 102 and a respective reverse link for receipt of signals from the mobile station 102. Either mobile station 102 receiving a data packet via RAN 104, or a user of mobile station 102 sending a data packet may reactivate dormant data session. Any number of mobile stations 102, 103, 105 may be coupled to RAN 104 and be in a dormant data session.

CBSC 110 may also include Packet Control Function (PCF) 118. In an embodiment, PCF 118 is coupled to communicate packet data, particularly IP packet data, between the mobile station 102, and the Packet Data Serving Node (PDSN) 139 over an A10/A11 interface. Packet control function 118 may operate to maintain a reachable state between RAN 104 and mobile station 102, ensuring a consistent link for data packets, buffering of data packets arriving from PDSN 139 when wireless link resources are not in place or are insufficient to support the flow from PDSN 139, and relay data packets between the mobile station 102 and PDSN 139.

PDSN 139 may be coupled to operate as the gateway from the RAN 104 into a public and/or private packet network, for example and without limitation, the Internet 113. In an embodiment, PDSN 139 may act as a network access server, home agent, foreign agent, and the like. PDSN 139 may manage the radio-packet interface between RAN 104 and Internet 113, provide IP addresses for the subscriber's mobile station 102, 103, 105, perform packet routing, actively manage subscriber services based on profile information, authenticate users, and the like.

In an embodiment, PCF 118 may be coupled to receive incoming data packets addressed to a dormant mobile station 102. In other words, PCF 118 may be coupled to receive incoming data packets addressed to reactivate a dormant data session with mobile station 102. Such incoming data packets may originate from a packet data network external to RAN 104, such as users connected to the Internet 113, and the like. As an example, incoming data packets may be incoming data coupled with a push-to-talk session, paging request, and the like. For example, mobile station 102 may be registered with RAN 104 but have no currently active data sessions in progress, i.e. mobile station 102 is in a dormant data session. The arrival of a data packet, for example as part of a paging request, may operate to reactivate dormant data session by reactivating dormant mobile station 102.

In an embodiment, PCF 118 is coupled to examine incoming data packets and determine if reactivation of a dormant data session with a dormant mobile station is permitted. In an exemplary embodiment, PCF may scan incoming data packets, including source IP addresses and destination IP addresses to determine if an incoming data packet is the product of a malicious IP scan or from a legitimate user.

In an illustrative embodiment, a first data packet 150 is received by PCF 118 via PDSN 139. First data packet 150 may have a source IP address 152 and a destination IP address 154. The source IP address 152 is an indication of the origination of the first data packet 150, while the destination IP address 154 may be coupled to reactivate dormant mobile station 102. In other words, first data packet 150 is addressed to reactivate a dormant data session with dormant mobile station 102. This can be, for example, a paging request, and the like.

After receiving first data packet 150, PCF 118 may receive a plurality of subsequent data packets 160. PCF 118 may categorize each of plurality of subsequent data packets 160 based on their source IP address. In an embodiment, if plurality of subsequent data packets 160 each have the same source IP address 152 as first data packet 150, this may be an indication of a malicious IP scan. Although three subsequent data packets 160 are shown, any number of plurality of subsequent data packets 160 are within the scope of the invention.

Plurality of subsequent data packets 160 each have a subsequent destination IP address 162, 164, 166 and a corresponding time stamp 163, 165, 167 of when they were received by PCF 118. In an embodiment, for each of the subsequent data packets 160 that have the same source IP address 152 as first data packet 150, PCF 118 may compare each of the plurality of subsequent destination IP addresses 162, 164, 166 and corresponding time stamps 163, 165, 167 to decide if first data packet 150 is permitted to reactivate dormant mobile station 102. If plurality of destination IP addresses 162, 164, 166 is substantially sequential, this is an indication that plurality of subsequent data packets 160 may be the product of a malicious IP scan. In other words, if PCF 118 receives plurality of subsequent data packets 160 from the same source IP address 152 and having a plurality of subsequent destination IP addresses 162, 164, 166 that are substantially sequential, although not necessarily consecutive, this may be an indication of a malicious IP scan.

As an example of an embodiment, plurality of subsequent destination IP addresses 162, 164, 166 may be substantially sequential, although not necessarily consecutive, in an increasing or decreasing pattern and be within the scope of the invention.

In an embodiment, PCF 118 may convert each of subsequent destination IP addresses into an ordinal numeric representation. An IP address is in a 32-bit format grouped eight bits at a time (an octet), separated by dots, and represented in decimal format (known as dotted decimal notation). Each bit in the octet has a binary weight (128, 64, 32, 16, 4, 2, 1). The minimum value for an octet is 0 and the maximum value for an octet is 255. As an example, plurality of subsequent data packets 160 having a plurality of subsequent destination IP addresses 162, 164, 166 that are substantially sequential, may be converted to an ordinal numeric representation such as 1, 2, 4, 5, 7, 8 . . . , or 10, 9, 7, 6, 4, 3 . . . , and the like.

In an embodiment, plurality of subsequent destination IP addresses 162, 164, 166 may be compared for the spread between them along with the difference in their corresponding time stamps 163, 165, 167. The comparison between each of plurality of subsequent data packets 160 that are subsequent to first data packet 150 may take place sequentially or non-sequentially.

Figure 2:
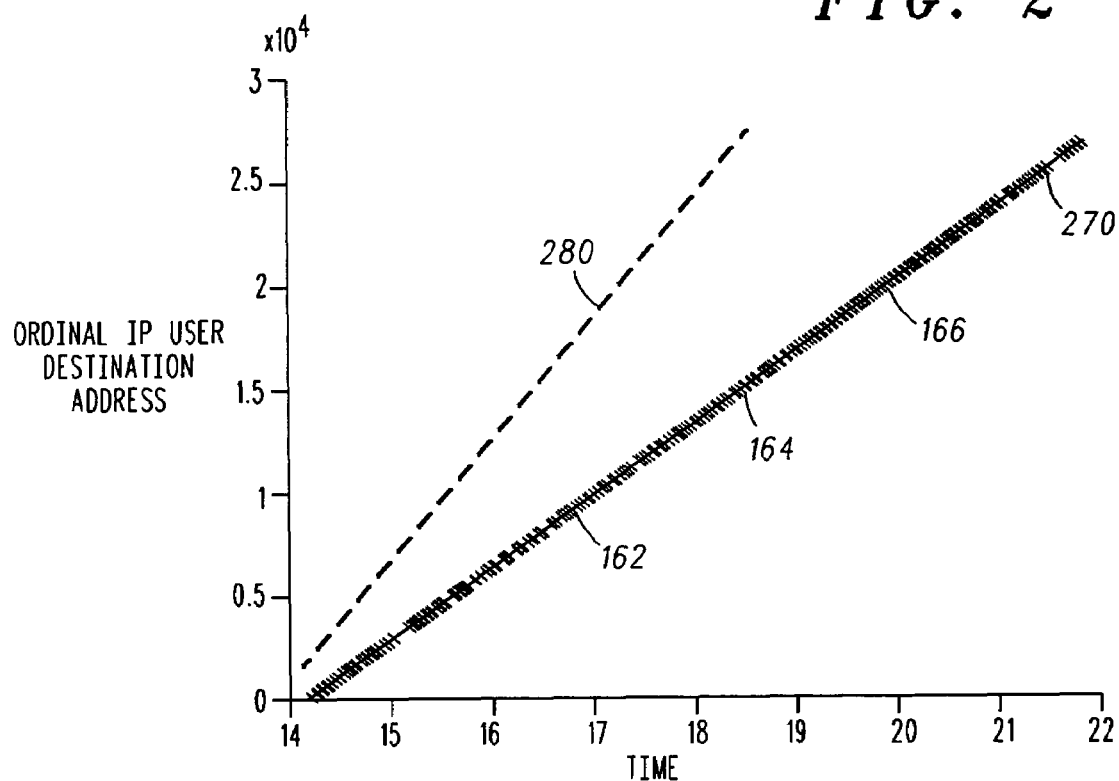
FIG. 2 representatively illustrates a graphical representation of subsequent destination IP addresses plotted against corresponding time stamps in accordance with an exemplary embodiment of the present invention.

FIG. 2 representatively illustrates a graphical representation 200 of subsequent destination IP addresses plotted against corresponding time stamps in accordance with an exemplary embodiment of the present invention. In the graph of FIG. 2, plurality of subsequent destination IP addresses 162, 164, 166 (these are representative as there are many more shown) have been converted to an ordinal numeric representation and plotted against their corresponding time stamps.

Although the exemplary embodiment of FIG. 2 shows plurality of subsequent destination IP addresses as being sequential and hence plotting as a tight linear function, deviations from this (fuzziness in the plot) are within the scope of the invention. For example, plurality of subsequent destination IP addresses plotted against their corresponding time stamps may not form a precise linear function and be within the scope of the invention. Plurality of subsequent destination IP addresses need only be substantially sequential, although not necessarily consecutive, to be within the scope of the invention.

In an embodiment, if at least a portion of subsequent destination IP addresses 162, 164, 166 are substantially sequential, and if an absolute value of a difference between each of the at least a portion of subsequent destination IP addresses 162, 164, 166 for a given difference in corresponding time stamps 163, 165, 167 is less than a threshold function 280, PCF 118 may deny the first data packet 150. In other words, for each of the subsequent destination IP addresses that are substantially sequential, PCF 118 may evaluate an absolute value of a slope 270 of the difference between the subsequent destination IP address over a difference in the corresponding time stamps. If the absolute value of the slope is less than a threshold function 280, the first data packet 150 may be denied, thereby preventing the first data packet 150 from reactivating the dormant mobile station 102.

This may be represented in another way as follows. For (n) plurality of subsequent data packets having a source IP address 152 the same as first data packet 150 the following may be evaluated:

Absolute value of the slope=abs[(IPdest(n)−IPdest(n−1))]/[timestamp(n)−timestamp(n−1)], where abs=absolute value function, IPdest(n) and IPdest(n−1)=subsequent destination IP address of subsequent data packet (n) and (n−1) respectively, and timestamp(n) and timestamp (n−1)=timestamp of arrival for subsequent data packet (n) and (n−1) respectively.

If the absolute value of the slope 270 is less than threshold function 280, first data packet 150 may be denied and discarded by PCF 118. Threshold function 280 may be any value or function set by one skilled in the art for a particular application that indicates a substantially linear IP scan in a given period of time. In other words, if PCF 118 detects a given source IP address sending a series of data packets having substantially sequential destination IP addresses in a given time period, PCF 118 may elect to deny the first data packet 150 and prevent reactivation of dormant mobile station 102. This may indicate a lack of sufficient randomness, or entropy, in plurality of subsequent destination IP addresses from a source IP address 152. First data packet 150 may then be deemed part of a malicious IP scan instead of a legitimate request for reactivation of a dormant data session. In an embodiment, PCF 118 may further elect to deny plurality of subsequent data packets 160 having source IP address 152 based on the above criteria.

In an embodiment, if the absolute value of the slope 270 is not less than threshold function 280, PCF 118 may permit first data packet 150 to reach dormant mobile station 102 and reactivate a dormant data session. In other words, a base transceiver station (BTS) service request may be sent to MSC. As an example of an embodiment, if absolute value of slope 270 is not less than threshold function 280, it may be an indication of sufficient randomness (i.e. entropy) of the plurality of subsequent destination IP addresses to indicate that plurality of subsequent data packets 160 are not the product of a malicious IP scan.

Although FIG. 2 illustrates a plot of substantially sequential plurality of subsequent destination IP addresses increasing, this is not limiting of the invention. As one skilled in the art is aware, depending on the ordinal numeric representation given to each of the plurality of subsequent destination IP addresses, the plot may return a positive or negative slope. The positive slope shown in FIG. 2 is representative. However, evaluating the absolute value of the slope will return a positive number and if the absolute value of the slope 270 is less than a threshold function 280, then first data packet 150 may be permitted to reach dormant mobile station 102, or a base transceiver station (BTS) service request may be sent to MSC.

Figure 3:
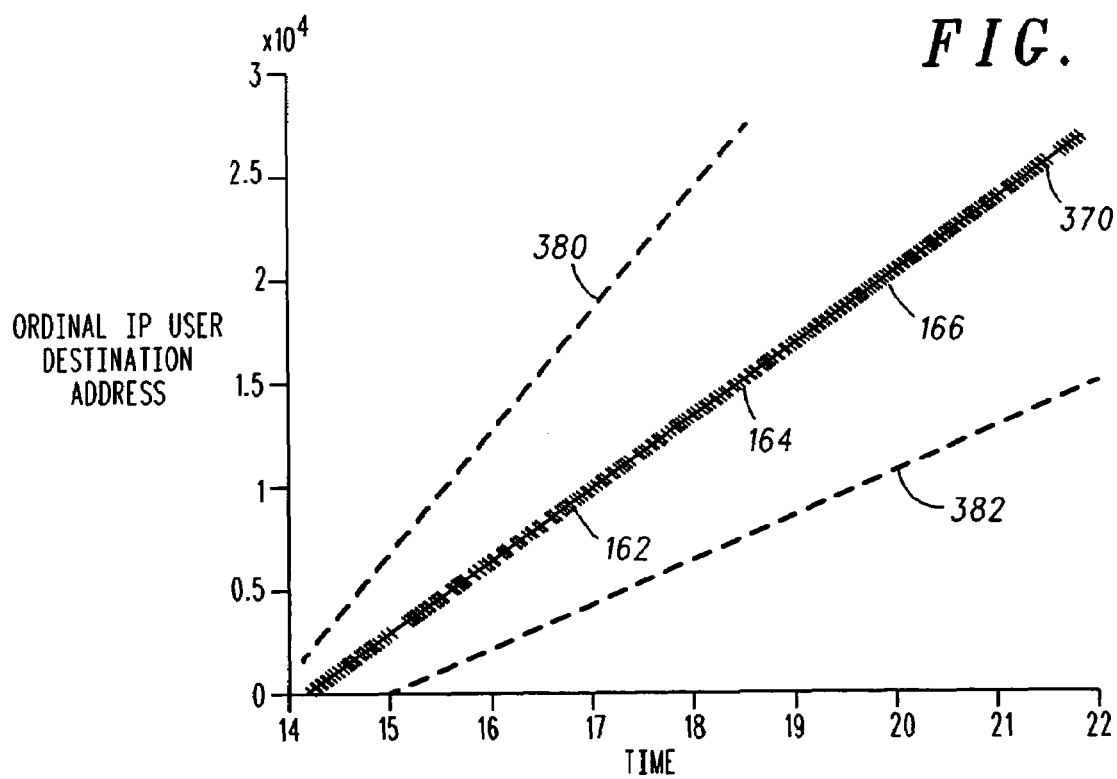
FIG. 3 representatively illustrates a graphical representation of subsequent destination IP addresses plotted against corresponding time stamps in accordance with another exemplary embodiment of the present invention.

FIG. 3 representatively illustrates a graphical representation 300 of subsequent destination IP addresses plotted against corresponding time stamps in accordance with another exemplary embodiment of the present invention. As shown in FIG. 3, plurality of subsequent destination IP addresses 162, 164, 166 (these are representative as there are many more shown) have been converted to an ordinal numeric representation and plotted against their corresponding time stamps. FIG. 3 is the same representation as shown in FIG. 2, with the addition of a second threshold function 382.

In an embodiment, if a at least a portion of subsequent destination IP addresses 162, 164, 166 are substantially sequential, and if an absolute value of a difference between each of the at least a portion of subsequent destination IP addresses 162, 164, 166 for a given difference in corresponding time stamps 163, 165, 167 is less than a threshold function 380 and greater than a second threshold function 382, PCF 118 may deny the first data packet 150. In other words, for each of the subsequent destination IP addresses that are substantially sequential, PCF 118 may evaluate an absolute value of a slope 370 of the difference between the subsequent destination IP address over a difference in the corresponding time stamps. If the absolute value of the slope is less than a threshold function 380 and greater than a second threshold function 382, the first data packet 150 may be denied and discarded, thereby preventing the first data packet from reactivating the dormant mobile station 102.

If the absolute value of the slope 370 is less than threshold function 380 and greater than second threshold function 382, first data packet 150 may be denied by PCF 118. Threshold function 380 and second threshold function 382 may be any values or functions set by one skilled in the art for a particular application that indicates a substantially linear IP scan in a given period of time. In other words, if PCF 118 detects a given source IP address sending a series of data packets having substantially sequential destination IP addresses in a given time period, PCF 118 may elect to deny the first data packet 150 and prevent reactivation of dormant mobile station 102. This may indicate a lack of sufficient randomness, or entropy, in plurality of subsequent destination IP addresses from a source IP address 152. First data packet 150 may then be deemed part of a malicious IP scan instead of a legitimate request for reactivation of a dormant data session. In an embodiment, PCF 118 may further elect to deny plurality of subsequent data packets 160 having source IP address 152 based on the above criteria.

In an embodiment, if the absolute value of the slope 370 is not less than threshold function 380 or is less than second threshold function 382, PCF 118 may permit first data packet 150 to reach dormant mobile station 102 and reactivate a dormant data session. In other words, a base transceiver station (BTS) service request may be sent to MSC. As an example of an embodiment, if absolute value of slope 370 is not less than threshold function 380, it may be an indication of sufficient randomness (i.e. entropy) of the plurality of subsequent destination IP addresses to indicate that plurality of subsequent data packets 160 are not the product of a malicious IP scan. If absolute value of slope 370 is less than second threshold function 382, it may be an indication of a push-to-talk session or other legitimate communication session taking place over a sufficient time period as to not indicate a malicious IP scan.

Figure 4:
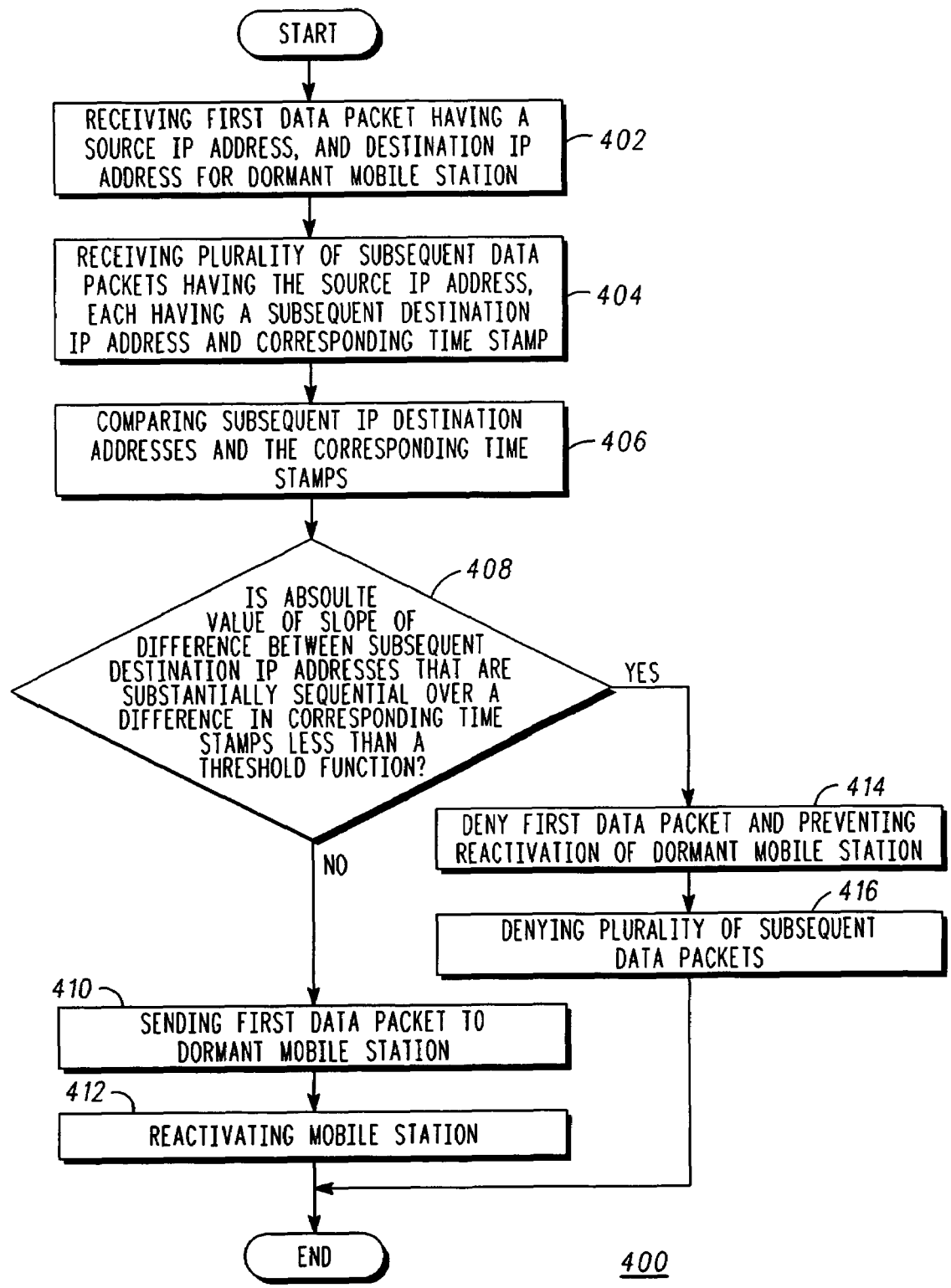
FIG. 4 representatively illustrates flow diagram in accordance with an exemplary embodiment of the present invention.

FIG. 4 representatively illustrates flow diagram 400 in accordance with an exemplary embodiment of the present invention. In step 402, PCF receives first data packet having a source IP address and a destination IP address, where the destination IP address is to a dormant mobile station. In other words, first data packet is addressed to reactivate a mobile station in a dormant data session.

In step 404, PCF receives a plurality of subsequent data packets having the same source IP address as first data packet, and a plurality of subsequent destination IP addresses and corresponding time stamps. In step 406, PCF compares plurality of subsequent destination IP addresses and corresponding time stamps for sufficient randomness, or entropy, to indicate that first data packet is from a legitimate user and not part of a malicious IP scan.

In step 408, for each of the subsequent destination IP addresses that are substantially sequential, PCF evaluates an absolute value of a slope of the difference between the subsequent destination IP address over a difference in the corresponding time stamps. If the absolute value of the slope is less than a threshold function, the first data packet may be denied, thereby preventing the first data packet from reactivating the dormant mobile station per step 414. Optionally, plurality of subsequent data packets may be denied entry into RAN as well per step 416.

If the an absolute value of a slope of the difference between the subsequent destination IP address over a difference in the corresponding time stamps is not less than the threshold function per step 408, PCF may send the first data packet to dormant mobile station per step 410, thereby reactivating dormant mobile station per step 412.

Figure 5:
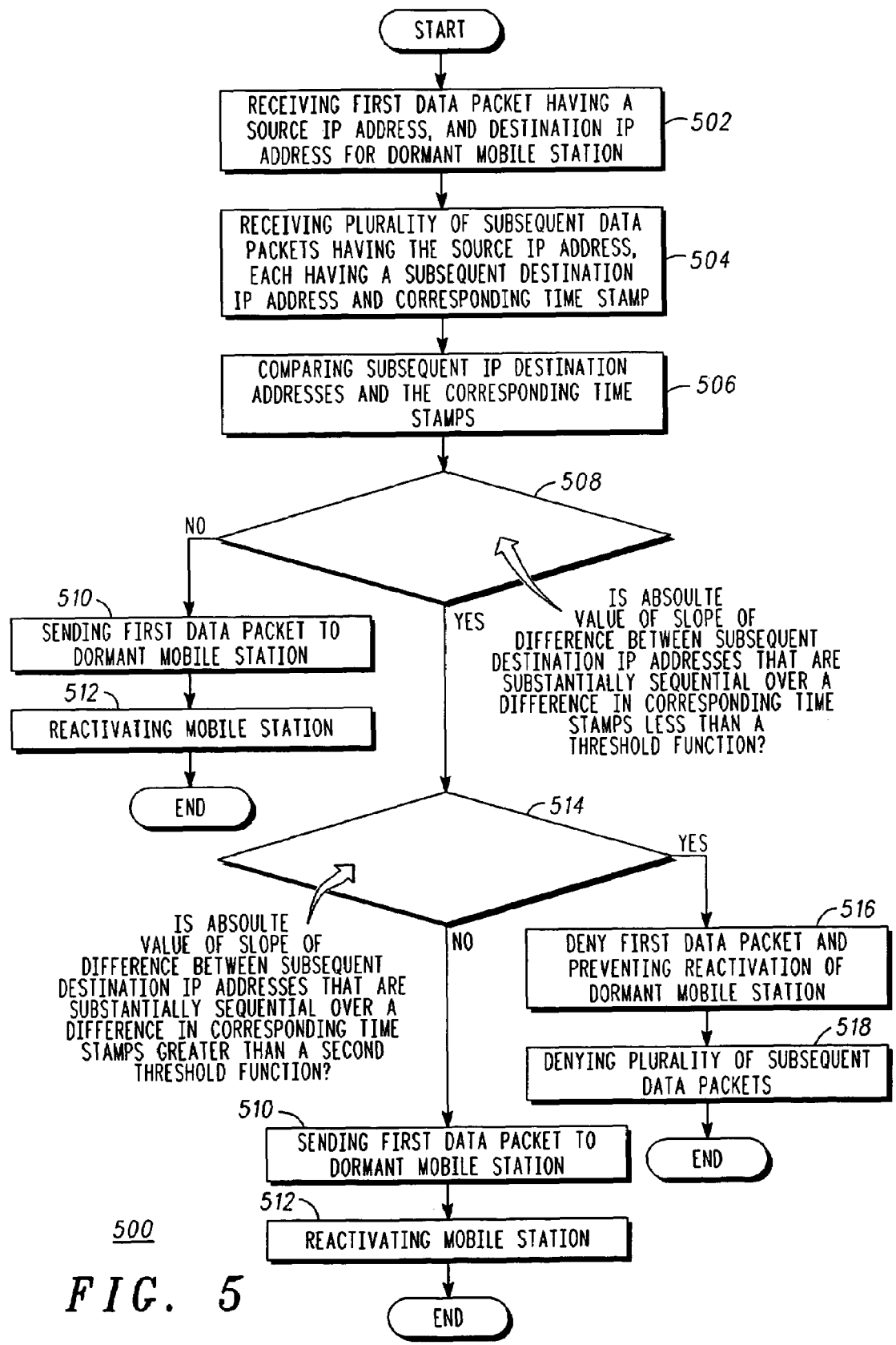
FIG. 5 representatively illustrates flow diagram in accordance with another exemplary embodiment of the present invention.

FIG. 5 representatively illustrates flow diagram in accordance with another exemplary embodiment of the present invention. In step 502, PCF receives first data packet having a source IP address and a destination IP address, where the destination IP address is to a dormant mobile station. In other words, first data packet is addressed to reactivate a mobile station in a dormant data session.

In step 504, PCF receives a plurality of subsequent data packets having the same source IP address as first data packet, and a plurality of subsequent destination IP addresses and corresponding time stamps. In step 506, PCF compares plurality of subsequent destination IP addresses and corresponding time stamps for sufficient randomness, or entropy, to indicate that first data packet is from a legitimate user and not part of a malicious IP scan.

In step 508, for each of the subsequent destination IP addresses that are substantially sequential, PCF evaluates an absolute value of a slope of the difference between the subsequent destination IP address over a difference in the corresponding time stamps. If the absolute value of the slope is less than a threshold function, it is determined if an absolute value of a slope of the difference between the subsequent destination IP address over a difference in the corresponding time stamps is greater than a second threshold function per step 514. If so, the first data packet may be denied, thereby preventing the first data packet from reactivating the dormant mobile station per step 516. Optionally, plurality of subsequent data packets may be denied entry into RAN as well per step 518.

If the an absolute value of a slope of the difference between the subsequent destination IP address over a difference in the corresponding time stamps is not less than the threshold function per step 508, PCF may send the first data packet to dormant mobile station per step 510, thereby reactivating dormant mobile station per step 512.

If the an absolute value of a slope of the difference between the subsequent destination IP address over a difference in the corresponding time stamps is not greater than the second threshold function per step 514, PCF may send the first data packet to dormant mobile station per step 520, thereby reactivating dormant mobile station per step 522.

In the foregoing specification, the invention has been described with reference to specific exemplary embodiments; however, it will be appreciated that various modifications and changes may be made without departing from the scope of the present invention as set forth in the claims below. The specification and figures are to be regarded in an illustrative manner, rather than a restrictive one and all such modifications are intended to be included within the scope of the present invention. Accordingly, the scope of the invention should be determined by the claims appended hereto and their legal equivalents rather than by merely the examples described above.

For example, the steps recited in any method or process claims may be executed in any order and are not limited to the specific order presented in the claims. Additionally, the components and/or elements recited in any apparatus claims may be assembled or otherwise operationally configured in a variety of permutations to produce substantially the same result as the present invention and are accordingly not limited to the specific configuration recited in the claims.

Benefits, other advantages and solutions to problems have been described above with regard to particular embodiments; however, any benefit, advantage, solution to problem or any element that may cause any particular benefit, advantage or solution to occur or to become more pronounced are not to be construed as critical, required or essential features or components of any or all the claims.

As used herein, the terms "comprise", "comprises", "comprising", "having", "including", "includes" or any variation thereof, are intended to reference a non-exclusive inclusion, such that a process, method, article, composition or apparatus that comprises a list of elements does not include only those elements recited, but may also include other elements not expressly listed or inherent to such process, method, article, composition or apparatus. Other combinations and/or modifications of the above-described structures, arrangements, applications, proportions, elements, materials or components used in the practice of the present invention, in addition to those not specifically recited, may be varied or otherwise particularly adapted to specific environments, manufacturing specifications, design parameters or other operating requirements without departing from the general principles of the same.

I claim:

1. A method for dormant data session reactivation, comprising:

receiving a first data packet by a packet control function in a radio access network, wherein the first data packet having a source IP address and a destination IP address and wherein the destination IP address coupled to reactivate a dormant mobile station coupled to the radio access network;

receiving a plurality of subsequent data packets by the packet control function wherein the subsequent data packets having the source IP address, a subsequent destination IP address and a corresponding time stamp;

comparing the subsequent destination IP address and the corresponding time stamp by the packet control function for each of the plurality of subsequent data packets; and denying the first data packet if at least a portion of the subsequent destination IP addresses are substantially sequential, and if an absolute value of a difference between each of the at least a portion of subsequent destination IP addresses that are sequential for a given difference in the corresponding time stamps is less than a threshold function, denying the first data packet.

2. The method of claim 1, further comprising denying the first data packet if at least a portion of the subsequent destination IP addresses are substantially sequential and if the absolute value of the difference between each of the at least a portion of subsequent destination IP addresses that are sequential for a given difference in the corresponding time stamps is less than a threshold function and greater than a second threshold function.

3. The method of claim 1, wherein denying the first data packet comprises preventing the first data packet from reactivating the dormant mobile station.

4. The method of claim 1, wherein comparing the plurality of subsequent IP packets and the corresponding time stamps comprises, for each of the at least a portion of the subsequent destination IP addresses that are substantially sequential, evaluating an absolute value of a slope of the difference between the subsequent destination IP addresses that are substantially sequential over a difference in the corresponding time stamps.

5. The method of claim 1, wherein the radio access network is a CDMA network.

6. The method of claim 1, further comprising converting each of the subsequent destination IP addresses into an ordinal numeric representation.

7. The method of claim 1, further comprising denying the plurality of subsequent data packets if at least a portion of the subsequent destination IP addresses are substantially sequential and if an absolute value of a difference between each of the at least a portion of subsequent destination IP addresses that are substantially sequential for a given difference in the corresponding time stamps is less than a threshold function.

8. A method for dormant data session reactivation, comprising:
    receiving a first data packet by a packet control function in a radio access network, wherein the first data packet having a source IP address and a destination IP address and wherein the destination IP address coupled to reactivate a dormant mobile station coupled to the radio access network;
    receiving a plurality of subsequent data packets by the packet control function wherein the plurality of subsequent data packets having the source IP address, a subsequent destination IP address and a corresponding time stamp;
    evaluating an absolute value of a slope of the difference between the subsequent destination IP addresses that are substantially sequential over a difference in the corresponding time stamps by the packet control function for each of the subsequent destination IP addresses that are substantially sequential; and
    denying the first data packet by the packet control function if the absolute value of the slope is less than a threshold function.

9. The method of claim 8, wherein sending the first packet to the dormant mobile station if the absolute value of the slope is not less than the threshold function.

10. The method of claim 8, wherein denying the first data packet if the absolute value of the slope is less than a threshold function and greater than a second threshold function.

11. The method of claim 8, wherein denying the first data packet comprises preventing the first data packet from reactivating the dormant mobile station.

12. The method of claim 8, wherein the radio access network is a CDMA network.

13. The method of claim 8, further comprising converting each of the subsequent destination IP addresses into an ordinal numeric representation.

14. The method of claim 8, further comprising denying the plurality of subsequent data packets if the absolute value of the slope is less than a threshold function.

15. A method for dormant data session reactivation, comprising:
    receiving a first data packet by a packet control function in a radio access network wherein the first data packet having a source IP address and a destination IP address, wherein the destination IP address coupled to reactivate a dormant mobile station coupled to the radio access network;
    receiving a plurality of subsequent data packets by the packet control function wherein the subsequent data packets having the source IP address, a subsequent destination IP address and a corresponding time stamp;
    evaluating an absolute value of a slope of the difference between the subsequent destination IP addresses that are substantially sequential over a difference in the corresponding time stamps by the packet control function for each of the subsequent destination IP addresses that are substantially sequential; and
    preventing the first data packet from reactivating the dormant mobile station by the packet control function if the absolute value of the slope is less than a threshold function.

16. The method of claim 15, wherein preventing the first packet from reactivating the dormant mobile function if the absolute value of the slope is less than a threshold function and greater than a second threshold function, preventing the first packet from reactivating the dormant mobile station.

17. The method of claim 15, wherein the radio access network is a CDMA network.

18. The method of claim 15, further comprising converting each of the subsequent destination IP addresses into an ordinal numeric representation.

19. The method of claim 15, further comprising denying the plurality of subsequent data packets if the absolute value of the slope is less than a threshold function.

20. The method of claim 15, wherein if the absolute value of the slope is not less than the threshold function, sending the first packet to the dormant mobile station.

* * * * *